Nov. 2, 1948.  S. A. ELLER  2,452,557

PROTECTED TUBE AND METHOD

Filed Aug. 11, 1945

INVENTOR.
Saul A. Eller
BY
Ralph L. Chappell
ATTORNEY

Patented Nov. 2, 1948

2,452,557

UNITED STATES PATENT OFFICE 2,452,557

PROTECTED TUBE AND METHOD

Saul A. Eller, New York, N. Y.

Application August 11, 1945, Serial No. 610,378

2 Claims. (Cl. 285—54)

(Granted under the act of March 3, 1883, as amended April 30, 1928; 370 O. G. 757)

This invention relates to tubes and to a method of protecting tubes, particularly condenser tubes, against the corrosive and erosive effects of liquids, such as salt water, flowing therethrough.

The inlet ends of condenser tubes, especially in shipboard condensers in which salt water is the cooling medium, deteriorate rapidly if unprotected. The tube ends ordinarily are flared and the strained condition of the metal makes it especially susceptible to electrolytic action.

It is an object of this invention to provide a method of protecting the inlet ends of condenser or other tubes against the deleterious effects of coolant liquid entering said tubes.

Another object is to provide a tube for carrying liquid, the interior of the entry end of which tube is protected against electrolytic action and other corrosive and erosive effects of the liquid to be carried.

Figure 1:
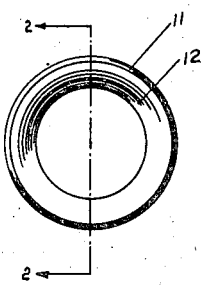
Figure 2:
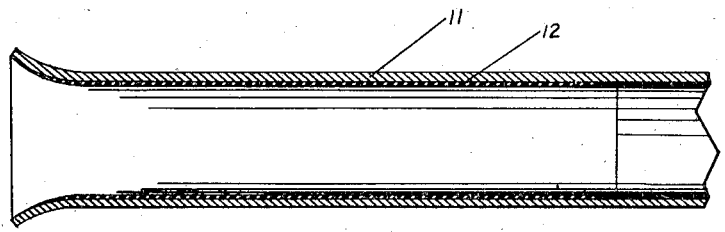

Further objects and advantages of this invention, as well as it construction, arrangement and operation, will be apparent from the following description and claims in connection with the accompanying drawing, in which, Fig. 1 is an end elevation of a condenser tube protected according to the method of this invention, looking toward the inlet end, and Fig. 2 is a section through the condenser tube, taken along the line 2—2 of Fig. 1.

A preferred embodiment of the invention comprises a condenser tube 11, flared at its end. Lining the interior surface of tube 11 is a thin coating 12 of rubber-like material. Coating 12 is preferably from .01" to .02" thick, and preferably extends over the first 6 to 12 inches of the inlet end of the tube.

The protected tube of this invention is made in the following manner. The interior of the entry end is coated with a composition capable of hardening to form an adherent protecting film. Suitable compositions for this purpose are rubber cements, which can be spread, and which harden in place to form a tough resistant film upon the evaporation of the cement solvents, either at room temperature or at slightly elevated temperatures. One example of such a cement is known by the trade name of Cement M-6128, manufactured by the United States Rubber Co., which sets at room temperature to a film of polymerized chloroprene. Another example of such a cement is known by the trade name of Gaco Neoprene, manufactured by the Gates Engineering Co., which when cured at a temperature of 140° F. sets to a film of polymerized chloroprene. Films of polymerized chloroprene have been found to be especially suitable in protecting condenser tubes from the corrosive and erosive effects of salt water. The coating composition can be any similar rubber cement or composition capable of forming an adherent, resistant rubber-like film.

The composition is preferably sprayed over the interior of the entry end of tube 11 from the entry end thereof to a point approximately 6 to 12 inches from the entry end, and sufficient depth built up to leave a coating approximately .01" to .02" in thickness. The composition is then allowed to harden in place, as by permitting the evaporation of solvent or by heating the coated tube 11 slightly. The coating 12 thus applied is not only capable of rapid and easy application but is also strongly adherent to the tube 11. The coating 12 offers little if any resistance to the flow of cooling liquid through tube 11, the coating being of smooth surface and gradually tapered to a feathered edge at both ends, and effecting substantially no reduction of cross-sectional area of tube 11. A rubber-like coating 12, because of its insulating properties, prevents electrolytic action on that area of tube 11 protected thereby and protects that part of tube 11 from contact with the cooling liquid passing therethrough, preventing any other corrosive action which might result therefrom. A coating 12 also protects the underlying surface of tube 11 from erosion.

The effect on heat transfer of coating 12 is negligible since only the first 6 to 12 inches of the tube 11 are covered thereby and the thickness of coating 12 is not great enough to interfere appreciably with the passage of heat therethrough. Furthermore, the entry end of the tube 11 is ordinarily encased in a tube sheet of appreciable width across which no heat transfer occurs.

The coating 12 when worn or otherwise deteriorated can be removed by use of a suitable solvent or by scraping, and a new coating 12 applied. This can be done, if desired, without removing tube 12 from the condenser of which it is a part.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A method for protecting a tube from corrosion and erosion comprising the steps of locating a spray source of rubber-like material at the entry end of the tube, directing a spray stream from said source along the inner surface of the tube to coat the tube for a longitudinal distance of about 6 to 12 inches, controlling said spray stream to form the coating with feathered edges at the entry extremity and at the extremity about 6 to 12 inches therefrom and to form the coating of about .01 to .02 inch thickness between the extremities, controlling said spray stream to streamline the exposed inner surface of the coating, and hardening said coating in situ by exposing said coating to air.

2. A conduit adapted to have fluid flow therethrough, said conduit comprising a metal tube having an entry end, and a coating bonded directly to the inner surface of the tube at the entry end by formation of the coating in situ, said coating being of rubber-like material, said coating extending into the tube from the entry end a distance of about 6 to 12 inches, said coating being formed with feathered edges at the entry end and at the extremity about 6 to 12 inches therefrom, said coating being formed of about .01 to .02 inch thickness between the extremities, the exposed inner surface of the coating being streamlined.

SAUL A. ELLER.

REFERENCES CITED

The following references are of record in the file of this patent:

UNITED STATES PATENTS

| Number | Name | Date |
| --- | --- | --- |
| 441,837 | Greenfield | Dec. 2, 1890 |
| 997,281 | Ely | July 11, 1911 |
| 2,225,615 | Bay | Dec. 24, 1940 |
| 2,310,927 | Bay | Feb. 16, 1943 |